Figure 1:
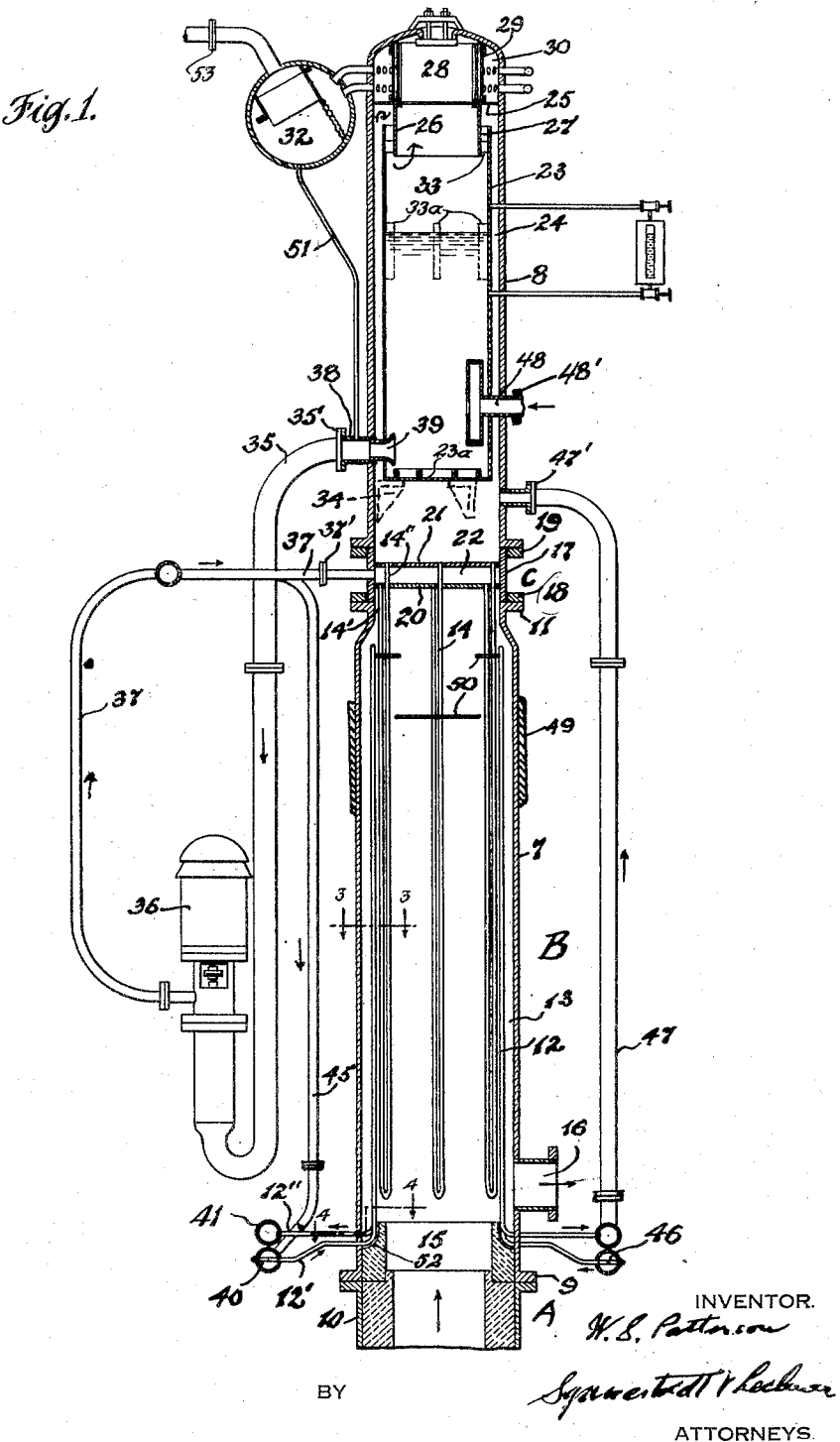

May 8, 1951 W. S. PATTERSON 2,552,505
WASTE HEAT BOILER FOR NATURAL GAS PROCESSING SYSTEMS
Filed Nov. 7, 1947 2 Sheets-Sheet 2
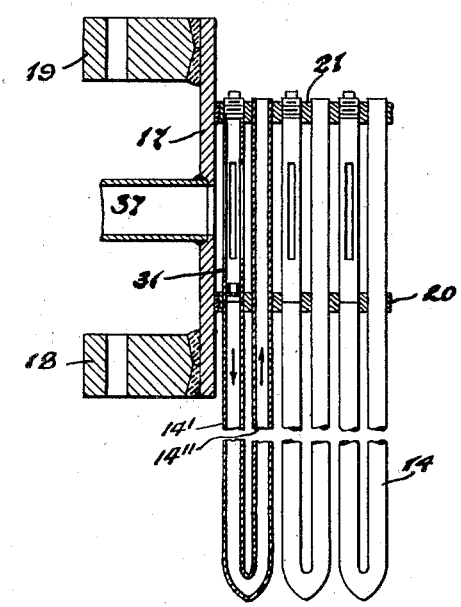
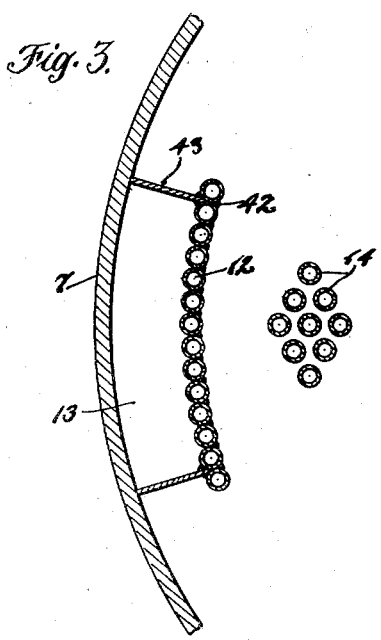
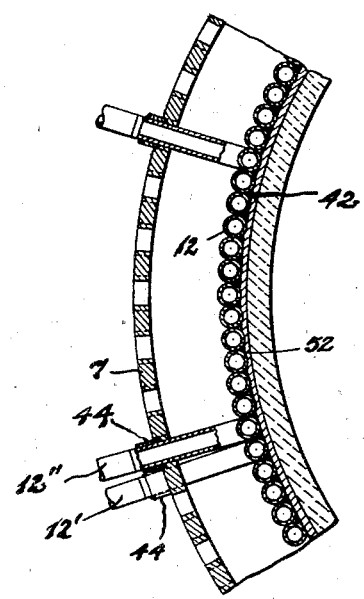
INVENTOR.
W. S. Patterson
BY
ATTORNEYS.

Patented May 8, 1951

2,552,505

UNITED STATES PATENT OFFICE 2,552,505

WASTE HEAT BOILER FOR NATURAL GAS PROCESSING SYSTEMS

Ward S. Patterson, Chappaqua, N. Y., assignor to Combustion Engineering-Superheater, Inc., a corporation of Delaware Application November 7, 1947, Serial No. 784,622

9 Claims. (Cl. 122—7)

This invention relates to a waste heat boiler for use in a system in which natural gas is processed to form other fuels and by-products therefrom, and similar systems.

In such processing of natural gas, the gas, preheated to a high temperature, say, for example, 1200° F., is delivered to a gas generator under substantial pressure, say from about 260 to about 300 p. s. i.; and along with it an oxidant, such as oxygen, of about 95% to 99% purity, preheated to about 600° F., is delivered for intimate admixture with the gas. The oxygen is delivered at the pressure of operaton. The oxygen is delivered in amounts insufficient for complete combustion, i. e., the gas is burned under reducing conditions and the methane of which it is largely composed, is converted into carbon monoxide and hydrogen. The temperature in the combustion chamber is quite high, usually in the neighborhood of 2500° F. In a subsequent stage of the processing, the gases thus generated are delivered to a catalytic reactor where the carbon monoxide and hydrogen are rearranged by catalysis to produce the desired fuels and such by-products as may be incident to such production.

Before the gases generated can be safely contacted with unprotected metal surfaces, such, for example, as the pipes leading to the reactor, the gases must be effectively cooled.

The primary purpose of this invention is to provide a simple and effective arrangement of waste heat boiler to extract heat from the gases and to generate as much steam as possible, this latter being highly desirable for the reason that such systems require a large amount of steam, and the more steam that can be generated by the waste heat boiler, the smaller the auxiliary equipment required to generate the additional amounts of steam required. It is also an object to provide an arrangement of boiler which is adapted to withstand the severe operating conditions before described.

How the foregoing, together with such other objects and advantages as may hereinafter appear or are incident to the invention are realized are illustrated in the accompanying drawings, wherein—

Figure 1 is a diagrammatic vertical section through a waste heat boiler embodying my improvements;

Figure 2 is an enlarged sectional view illustrating certain details of the invention, and Figures 3 and 4 are enlarged sectional views taken on the lines 3—3 and 4—4 of Fig. 1.

Referring now to Figure 1, the reference character A indicates the outlet end of means for delivering the hot gases to the waste heat boiler, and such means may be the top end portion of a generator in which the natural gas is converted into carbon monoxide and hydrogen or it may be a conduit leading from such a generator or other source of heated gases.

The reference character B denotes the waste heat boiler, considered as a whole, and as before stated the generated gases are delivered thereto at a temperature of about 2500° F. and at high pressure.

Referring now more particularly to the waste heat boiler, it will be seen that it comprises a gas cooling section enclosed by the casing 7 and a casing-like water and steam drum 8, each of which is of welded construction so as to be fluid-tight and pressure-tight. They are circular in cross section to withstand the pressures. Casing 7 has a flange 9 at its lower end for coupling to the refractory lined flanged casing 10. The flanges are detachably secured together in conventional manner, as by means of nuts and bolts, or by a seal weld which may be readily cut, not shown.

At its upper end, the casing 7 has a flange for connection with the flanged closure member indicated as a whole by the reference C. The respective flanges are detachably secured together in the same manner as heretofore described.

Casing 7 constitutes a gas cooling and steam generating section, the top of which is closed by the closure member C. Extending upwardly from the lower portion of the cooling section is an annular tubular water wall 12 to be hereinafter described. This wall is spaced away from the casing to provide an annular space or flue 13, and the water wall extends to a point short of the closure C, so that the space 13 communicates at its top with the interior of the space defined by the water wall.

The interior space defined by the tubular water wall is filled with a bundle of tubes 14, which bundle is suspended from the closure member C, as will be described. The bundle of tubes extends downwardly to a point just short of the inlet opening 15 of the cooling section.

The hot gases entering the cooling section through the inlet opening 15 are subjected to the cooling action not only of the bundle of tubes but also of the tubular water wall, the amount of cooling surface being preferably such that the gases enter the top of the flue or space 13 at a temperature of approximately 600° F. As the gases pass downwardly through such space or flue, they are further cooled by the water wall and finally exit through the outlet 16 near the bottom of the cooling section, from whence they are led to the remaining portions of the system.

The closure C preferably comprises a ring 17 having flanges 18 and 19 welded thereto. A pair of disk-like spaced diaphragms or tube plates are welded at their peripheries to the ring 17 so as to provide a space or chamber 22.

The tubes of bundle 14 are preferably counterparts. Considering but one tube, it will be seen that the inlet end 14' thereof is connected to the lower tube plate 20 by a rolled joint and extends downwardly to near the bottom of the casing 7 where it is rebent on itself to pass upwardly, the outlet end 14" thereof passing through tube plate 20 and being terminated in tube plate 21, the tube lengths or passes being closely adjacent to one another. Where the outlet ends of tubes 14 pass through tube sheet 20, they are rolled thereinto to make a pressure-tight connection. Various other methods of attaching the tubes 14 to the tube sheets 20 and 21 may be employed, this feature of the design being similar to and more completely described in my copending application Serial No. 783,108, filed October 30, 1947.

The inlet ends of the tubes 14 are supplied from chamber 22 for which purpose replaceable metering orifice devices 31 (see Figure 2) are provided to secure uniformity of distribution among the tubes of the bundle. As and when needed, metering devices having orifices of appropriate size to secure the desired distribution are employed. The steam generated in the tubes is discharged into the water and steam drum above the tube sheet 21, which drum is secured to closure member C in the manner hereinbefore described.

Mounted within the steam and water drum 8 is a primary water separator in the form of a vertical cylinder 23 which is open at the top. This cylinder has a smaller diameter than the drum 8 so as to provide annular space 24 therebetween. A ring-shaped diaphragm 25 is welded to the drum 8 at a point above the upper end of cylinder 23. Depending from the diaphragm 25 is a sleeve-like or cylindrical member 26 which extends for a short distance into the cylinder 23. The diameter of the sleeve 26 is less than that of cylinder 23 so as to provide an annular inlet space 27 establishing communication between space 24 and the interior of cylinder 23.

Steam and water mixture discharged into the bottom of the drum 8 rises through the space 24, passes around the top of cylinder 23, and enters the interior of the cylinder where the water is separated from the steam. The steam thence passes upwardly through cylindrical member 26 into the space 28 defined by the screen members 29 in the top of drum 8.

It will be seen that the steam and water mixture in passing from space 24 into the space defined by the member 26, reverses its direction of flow, thus serving to separate water from steam. This separation occurs largely within the cylinder member 23, the separated water collecting therein as shown. To assist in effecting separation of water, angularly disposed vanes 33 are located in the space 27 for imparting a swirling or vertical movement to the mixture, thereby separating water and steam by centrifugal force. The vanes 33a are located near the normal water level to retard the rotational motion of the water after separation from the steam. Since the mixture discharging from tube ends 14" will be approximately 70–80% steam by volume and must all pass through the annulus 24, there is no water level in the annulus but a level is maintained in the cylinder 23 as shown. Such water as is not separated in cylinder 23 is separated by the screens 29, the space 30 surrounding such screens constituting a space for dry steam. The dry steam may be directly led from such space to point of use for power or process. However, should unusually pure steam be required it may be led from such space to the supplemental water separating drum 32, in which additional moisture removal apparatus of conventional design is located.

To support the cylinder 23 in the drum 8, supporting brackets 34 may be provided as indicated in dotted lines in Figure 1.

A downcomer pipe 35 leads from the lower portion of cylinder 23 to the forced circulation pump 36 from which a delivery pipe or pipes 37 lead to the chamber 22 of the closure member C. The inlet end of pipe 35 is provided with a flanged nipple-like member 38 welded to drum 8. Telescoping in nipple 38 is a second nipple-like member 39 which is welded to the cylinder 23 and to nipple 38. This is an arrangement that facilitates assembly of the parts and the securing of tight joints.

Referring now to the tubular water wall 12, this is composed of a plurality of units, each unit consisting of a tube preferably bent as follows: Considering one tube unit, the inlet end 12' thereof is connected to a doughnut-like supply header 40 from which the tube extends inwardly through the casing 7 and is then bent so as to extend upwardly to the top of the water wall where it is rebent on itself to pass downwardly, thus providing two closely spaced tube lengths or passes. The outlet end 12" of the tube is bent to pass outwardly through the casing 7 for connection to the doughnut-like header 41. Adjacent tube lengths are welded together as indicated at 42 in Figures 3 and 4 in order to form a continuous gas tight wall. To position the water wall with respect to the casing 7 radial plates 43 are provided, these plates being welded to the water wall as indicated in Fig. 3 and merely bearing against the inner surface of the casing 7. Where the inlet and the outlet ends 12" and 12' pass through the casing 7, sleeves 44 are provided, these sleeves being welded to the tube and to the casing as indicated in Figure 4, thus providing a gas-tight and steam-tight joint. The ring-like seal plate 52 of Figures 1 and 4 is welded to the tubes and to the casing to form a gas-tight partition between the space 15 and space 13.

Header 40 is supplied from forced circulation pump 36 by means of a pipe or pipes 45. Orifice metering devices 46 of the character hereinbefore described are provided in header 40 to secure uniformity of distribution as between the tube units constituting the water wall. The steam generated in the tubes of the water wall discharges into the header 41 from which it is led to the steam space above the closure member C by means of a pipe or pipes 47.

Make-up feed water is supplied by pipe 48 to maintain water in drum at desired level.

The casings 7 and 8 are lagged. Only a portion of the lagging is indicated at 49. Drum 8 is provided with a manhole and the bottom plate of cylinder 23 is also provided with a manhole 23a for access to the tube sheet 21 and metering devices 31.

To improve heat absorption efficiency in the tube bundle, baffles 50 are provided. Only a few of the baffles are shown. Pipe 51 delivers water from the separator drum 32 to the pipe 35 as shown in Figure 1.

It will be seen that the tubes of the water wall, being fixedly supported only at the closely spaced inlet and outlet ends thereof, are free to expand and contract. Similarly the tubes of the bundle are free to expand and contract. Also drum 3 and the parts directly associated therewith may be assembled as a unit in the shop and shipped as such, or assembled on the ground and handled as a unit. The same is true of the casing 7 and the parts directly associated therewith. Access to the closure member may be had by entrance through the manhole previously described or by breaking the joint between the closure member and drum 8 and by breaking joints 53, 47', 35' and 48' and removing drum 8. Major repairs to the tube bundle and to the water wall may be effected by breaking the joint between the closure member C and casing 7 and by breaking the joints aforementioned, as well as joint 37'. Thus drum 8 and its parts, closure C and the tube bundle may be handled as a unit and withdrawn from casing 7. The boiler is of compact construction and is very effective in the absorption of heat from the gases and in steam generation.

In the installation shown the waste heat boiler is about 60 feet high, from which the size of the remaining parts can be visualized. The tubes of the bundle and of the water wall are preferably about 1¼" to 1½" outside diameter with a wall thickness of about 0.10 to 0.15 inch depending on the steam pressure. In the installation shown, the amount of evaporating surface presented by the tubes of the bundle is approximately 10,000 square feet and that presented by the water wall is about 1,000 square feet.

While the boiler has been described in connection with conversion of natural gas into other fuels, it will be understood that it has application to other systems in which hot gases are cooled and steam there generated.

Reference is also made to my copending application Serial No. 34,678, filed June 23, 1948, a division of my copending application Serial No. 763,343, filed July 24, 1947, directed broadly to subject matter herein disclosed but not claimed.

While the drum 8 has been shown in connection with a boiler receiving waste gas from a source not shown, it will be understood that the drum 8 together with its internal and external attachments for producing dry steam may be used in place of the collecting dome and steam and water drum with the gas generator boiler and furnace arrangement covered by my copending application Serial No. 783,103, filed October 30, 1947.

I claim:

1. A waste heat boiler for recovering heat from hot gases and generating steam comprising an upright gas cooling section having an inlet at its lower end for the hot gases, a closure for the upper end of the section, an upright steam and water drum above the closure the bottom wall of which is said closure, a bundle of steam generating tubes suspended from said closure and extending into the cooling section and discharging into said steam and water drum, a water separating cylinder in said steam and water drum open at the top but otherwise substantially imperforate and having a diameter substantially less than that of said drum whereby to provide a passage for steam and water therebetween, a sleeve located at the open end of the water separating cylinder for directing the mixture into said cylinder, a pump, a downcomer pipe leading from the water space of said cylinder to said pump, and a delivery pipe connected to said pump and said bundle for supplying water to said bundle of tubes.

2. The boiler of claim 1 in which the closure is provided with two vertically spaced tube sheets to form a chamber or header with which said delivery pipe connects, and in which the tubes of the bundle are rebent on themselves and have their inlet ends connected with the lower tube sheet and their outlet ends delivering into the space within the steam and water drum above said upper tube sheet.

3. The boiler of claim 1 in which the upper part of said steam and water drum is compartmented above the cylinder to provide a dry steam space provided with a steam outlet and in which a steam and water separator is located in advance of said dry steam space and serially disposed with respect to said water separating cylinder.

4. The boiler of claim 1 in which the gas cooling section and the steam and water drum are detachably connected to said closure.

5. The boiler of claim 1 in which the cooling section is provided with a tubular water wall surrounding said tube bundle and spaced away from the wall of said cooling section with its upper end terminating short of said closure, and in which said cooling section has a gas outlet at its lower end.

6. The boiler of claim 1 in which the cooling section is provided with a tubular water wall surrounding said tube bundle and spaced away from the wall of said cooling section with its upper end terminating short of said closure, and in which said cooling section has a gas outlet at its lower end and in which connections are provided between the inlet ends of the water wall tubes and the outlet of the pump and between the outlet ends of such tubes and the steam and water drum.

7. The boiler of claim 1 in which the cooling section is provided with a tubular water wall surrounding said tube bundle and spaced away from the wall of said cooling section with its upper end terminating short of said closure, and in which said cooling section has a gas outlet at its lower end and in which connections are provided between the inlet ends of the water wall tubes and the outlet of the pump and between the outlet ends of such tubes and the steam and water drum, said connections including ring-like headers surrounding the cooling section.

8. The boiler of claim 1 in which the cooling section is provided with a tubular water wall surrounding said tube bundle and spaced away from the wall of said cooling section with its upper end terminating short of said closure, and in which said cooling section has a gas outlet at its lower end, the tubes of said water wall being rebent on themselves to provide closely spaced passes.

9. The boiler of claim 1 in which the closure consists of a short cylinder flanged at each end and two vertically spaced disk-like tube sheets welded to said cylinder.

WARD S. PATTERSON.

REFERENCES CITED

The following references are of record in the file of this patent:

UNITED STATES PATENTS

| Number | Name | Date |
|---|---|---|
| 551,161 | Gaiennie | Dec. 10, 1895 |
| 894,407 | Suzuki | July 28, 1908 |
| 2,112,321 | Wood | Mar. 29, 1938 |
| 2,373,564 | Huff | Apr. 10, 1945 |